US009392029B2

(12) United States Patent
Lee et al.

(10) Patent No.: US 9,392,029 B2
(45) Date of Patent: *Jul. 12, 2016

(54) SESSION INITIATION PROTOCOL MESSAGE ROUTING METHOD BETWEEN IP NETWORKS USING DIFFERENT IP ADDRESS FORMAT

(71) Applicant: KT Corporation, Seongnam-si (KR)

(72) Inventors: Jang-won Lee, Goyang-si (KR); Ho-Jin Lee, Goyang-si (KR); Sang-Man Bak, Goyang-si (KR)

(73) Assignee: KT Corporation, Seongnam-si (KR)

( * ) Notice: Subject to any disclaimer, the term of this patent is extended or adjusted under 35 U.S.C. 154(b) by 252 days.

This patent is subject to a terminal disclaimer.

(21) Appl. No.: 13/692,255

(22) Filed: Dec. 3, 2012

(65) Prior Publication Data

US 2013/0179582 A1   Jul. 11, 2013

Related U.S. Application Data

(62) Division of application No. 13/025,911, filed on Feb. 11, 2011, now Pat. No. 8,346,962, which is a division of application No. 12/298,426, filed as application No. PCT/KR2007/001996 on Apr. 24, 2007, now Pat. No. 8,140,707.

(30) Foreign Application Priority Data

Apr. 24, 2006  (KR) .................. 10-2006-0036568
May 16, 2006  (KR) .................. 10-2006-0043828

(51) Int. Cl.
*G06F 15/16*  (2006.01)
*H04L 29/06*  (2006.01)
*H04L 29/12*  (2006.01)

(52) U.S. Cl.
CPC ...... *H04L 65/1006* (2013.01); *H04L 29/06027* (2013.01); *H04L 29/12367* (2013.01);

(Continued)

(58) Field of Classification Search
CPC ....... H04L 12/70; H04L 12/46; H04L 12/749; H04L 12/66; H04L 29/06; H04L 65/1006; H04L 29/06027; H04L 29/12528; H04L 29/12367; H04L 29/12556; H04L 61/2585; H04L 61/2575; H04L 61/2514; H04L 65/103; H04L 65/1043; H04L 65/104
USPC ................................ 709/227–228, 238, 245
See application file for complete search history.

(56) References Cited

U.S. PATENT DOCUMENTS 6,226,751 B1  5/2001  Arrow et al.
6,717,949 B1  4/2004  Boden et al.
(Continued)

FOREIGN PATENT DOCUMENTS

KR   1019990050416 A    7/1999
KR     20030048246 A    6/2003
(Continued)

OTHER PUBLICATIONS

Sagisaka et al., "A Study on Session Control Method for SIP-ALG," pp. 5-8, IEICE Technical Report, vol. 103, No. 506, Dec. 12, 2003.
(Continued)

*Primary Examiner* — Benjamin M Thieu
(74) *Attorney, Agent, or Firm* — Sughrue Mion, PLLC

(57) ABSTRACT

Disclosed are the examples of an interworking system and related methods. The interworking system can be configured to implement a session initiation protocol (SIP) message routing method that may include checking a transmitting subject and a transmission method of a SIP message, applying a network address translation based on the checked message's transmitting subject and its transmission method, and specifying the address of the node selected based on the checked message's transmitting subject in routing path information.

4 Claims, 18 Drawing Sheets

(52) U.S. Cl.
CPC .... *H04L29/12528* (2013.01); *H04L 29/12556* (2013.01); *H04L 61/2514* (2013.01); *H04L 61/2575* (2013.01); *H04L 61/2585* (2013.01); *H04L 65/103* (2013.01); *H04L 65/104* (2013.01); *H04L 65/1043* (2013.01)

(56) References Cited

U.S. PATENT DOCUMENTS

| | | | | |
|---|---|---|---|---|
| 7,333,500 | B2* | 2/2008 | Roshko | H04L 29/125 370/389 |
| 7,411,917 | B1 | 8/2008 | Hardie et al. | |
| 7,543,064 | B2 | 6/2009 | Juncker et al. | |
| 7,594,259 | B1 | 9/2009 | Audet et al. | |
| 7,620,033 | B2 | 11/2009 | Chu et al. | |
| 7,706,401 | B2 | 4/2010 | Bae et al. | |
| 7,787,459 | B2 | 8/2010 | Yuan et al. | |
| 2002/0138622 | A1* | 9/2002 | Dorenbosch et al. | 709/227 |
| 2005/0201357 | A1* | 9/2005 | Poyhonen | 370/352 |
| 2005/0267978 | A1* | 12/2005 | Satapati | H04L 29/12066 709/230 |
| 2006/0120293 | A1 | 6/2006 | Wing | |
| 2006/0209794 | A1* | 9/2006 | Bae et al. | 370/352 |
| 2008/0080510 | A1* | 4/2008 | Zancan | 370/392 |
| 2008/0114871 | A1* | 5/2008 | Biswas | H04L 29/12462 709/224 |
| 2008/0183892 | A1* | 7/2008 | Holder et al. | 709/240 |
| 2008/0208605 | A1* | 8/2008 | Sinha | G06Q 10/10 705/1.1 |
| 2009/0170557 | A1* | 7/2009 | Chauhan | H04W 36/14 455/552.1 |

FOREIGN PATENT DOCUMENTS

| | | |
|---|---|---|
| KR | 20040058641 A | 7/2004 |
| KR | 20040110032 A | 12/2004 |
| WO | 2006020975 A2 | 2/2006 |

OTHER PUBLICATIONS

Peter Koski, Jorma Ylinen, Pekka Loula; *The SIP-Based System Used in Connection with a Firewall*; Proceedings of the Advanced International Conference on Telecommunications and International Conference on Internet and Web Applications and Services; 2006; 6 pages; IEEE Computer Society.

D. Raz, J. Schoenwaelder, B. Sugla; *An SNMP Application Level Gateway for Payload Address Translation*; The Internet Society, Network Working Group; Oct. 2000; 20 pages.

PCT International Search Report; Jan. 2004; 15 pages.

Hayashi et al., "A Study on Control Method of Binding-Address Entries in SIP Application Level Gateway (SIP-ALG)," *Technical Report of IEICE*, The Institute of Electronics, Information and Communication Engineers, vol. NS2002-188 PS2002-62, Dec. 9, 2002.

Rosenberg et al., "Simple Traversal of UDP Through Network Address Translators (NAT) (STUN); draft-ietf-behave-rfc3489bis-03.txt," Feb. 2006. Retrieved from the Internet: <http://toolsietf.org/id/draft-ietf-behave-rfc3489bis-03.txt>. 53 pages.

Stott et al., "SAFENeT: Sever-Based Architecture for Enterprise NAT and Firewall Transversal; dratf-stott-behave-safenet-00.txt," Jun. 29, 2005. Retrieved from the Internet: <http://tools.ietf.org/html/draft-stott-behave-safenet-00>. 35 pages.

"The Road to Be a Network Expert: SIP Environment Decided by Open Sauce—Co-Existence of both SIP and NAT," *Software Design*, Jun. 18, 2004, vol. 2, pp. 100-109.

"Technology to Introduce IP Phone without Failure: NAT Pass & Security," *Network Magazine*, vol. 10, Oct. 1, 2005, pp. 150-153.

\* cited by examiner

FIG. 9

| Type | Call Tx | Call Rx | ALG translation applying message |
|---|---|---|---|
| Case(1) | Private | Public | INVITE |
| Case(2) | Public | Private | 200 OK (for INVITE) |

P201 — Case(1)
P203 — Case(2)

FIG. 12

| | | | ALG |
|---|---|---|---|
| Case(1) | Private | Public | INVITE |
| Case(2) | Public | Private | 200 OK (for INVITE) |

P201 — (Case(1) row)
P203 — (Case(2) row)

SESSION INITIATION PROTOCOL MESSAGE ROUTING METHOD BETWEEN IP NETWORKS USING DIFFERENT IP ADDRESS FORMAT

CROSS-REFERENCE TO RELATED APPLICATIONS

This application is a divisional of U.S. patent application Ser. No. 13/025,911, filed Feb. 11, 2011, which is a divisional of U.S. patent application Ser. No. 12/298,426, filed Oct. 24, 2008, which issued as U.S. Pat. No. 8,140,707, on Mar. 20, 2012, which is a National Phase Application of PCT/KR2007/001996, filed Apr. 24, 2007, which claims priority to Korean Patent Application Nos. KR10-2006-0036568, filed Apr. 24, 2006, and KR10-2006-0043828, filed May 16, 2006. The disclosures of the prior applications are hereby incorporated in their entireties by reference.

TECHNICAL FIELD

The present invention relates to an interworking system between IP networks using different IP address format, an application layer gateway (ALG) server, a STUN server, a network address translator, an interworking method thereof, and a SIP message routing method thereof.

BACKGROUND OF THE INVENTION

The IP multimedia subsystem (IMS) that is called the third generation network platform provides all the services on the IP basis, differing from the existing circuit-based network system.

The IMS that is the third generation switching system following the circuit switch and the soft switch combines voice and data service into a single structure and transmits the single structure to a device fixed to an IP network or a mobile device.

Also, the IMS has a meaning of changing the network to the open type by using the Internet protocol.

The IMS is a matter of primary concern in the communication field as it increases the flexibility of the wired/wireless network service to accelerate network convergence, it reduces application development and management costs, and it diversifies new services.

The IP network allocates at IP that is usable anywhere in the world, that is, a public IP address to each terminal, and identifies the address of the transmission source during a communication between the terminals.

However, as the IP network application as well as the IMS have been extended, the increase of usage thereof has made the capacity of the public IP addresses very insufficient.

Most of the communication service providers are using the network address translation technology to attempt to ensure sufficient public IP addresses and security of networks of the communication service providers.

The network address translator (NAT) is an address translation device of a communication network translating the private IP addresses into public IP addresses.

That is, the NAT allocates a private IP address available for a local network to the terminal.

When the terminal uses another network or a public Internet, the private IP address allocated to the terminal is changed with a public IP address, and the public IP address is changed with the private IP address.

Also, the port address translation (PAT), which is one of the network address translation technology, changes a port number of a TCP/UDP in addition to the IP address.

Accordingly, the public IP address is used by a plurality of users to thus ameliorate the problem of insufficient public IP addresses.

However, the NAT analyzes Layer 3 and Layer 4 headers of an OSI model and cannot analyze further higher layers, and the NAT cannot support Internet applications including recognition information (an address of the place of dispatch and a port of dispatch) of a packet generating host in a payload within the Layer 4 header of the packet, which is called the problem of the NAT-traversal.

That is, the problem of the NAT-traversal means that the case of unavailable receipt routing is generated from the outside since the recognition information of the packet generating host is set as a receipt address of the terminal within the local network, that is, a private IP address cannot be changed to the public IP address by the NAT.

The simple traversal under UDP through NAT (STUN) has been proposed as a prior art for solving the problem.

The STUN technology is based on the server-client. A STUN server is located outside the NAT to provide the public IP address and port information allocated by the NAT.

According to the STUN technology, respective terminals for driving a STUN-client acquire a technology IP address translated by the NAT from a STUN server.

However, since it is needed to drive the STUN-client for each terminal, it is difficult to apply the STUN technology to the network and the STUN technology acts on the terminal as a load.

Also, a call transmitting terminal may not know whether a call receiving terminal is provided on the same network before a call connection.

In this case, an unneeded process for accessing the STUN server through the NAT is performed even though the call receiving terminal is provided on the network requiring no passing through of the NAT.

Therefore, an undesirable call process is generated and radio channels are wasted.

BRIEF SUMMARY OF THE INVENTION

The present invention has been made in an effort to solve the NAT-traversal problem for interworking between the networks using different IP address format.

The present invention has been made in another effort to provide SIP message routing for interworking the networks using different IP address format on the SIP basis.

The present invention has been made in another effort to provide interworking for a SIP service between networks using SIP-based different IP address format.

In one aspect of the present invention, an interworking system for interworking between a local network for using a private IP address and a public network for using a public IP address by using network address translator (NAT) includes: a STUN server, provided outside the NAT, for providing public IP binding information to a private IP address having passed through the NAT; and an application layer gateway (ALG) server, provided on the local network, for providing media receiving address information in a private IP format included in a payload of a call connection request packet received from a call transmitting terminal to the STUN server to receive media receiving address information that is translated into a public IP format, and applying the received media receiving address information to the received call connection request packet to transmit the same to a call receiving terminal.

In another aspect of the present invention, an interworking method between a local network using a private IP address and a public network using a public IP address by using NAT includes: (a) extracting media receiving address information in the private IP format from a payload of a call connection request packet received by the local network from a call transmitting terminal; (b) transmitting a public IP binding request in which header information is changed with the extracted media receiving address information in the private IP format; (c) receiving a public IP binding response including the header information that is translated into the public IP by the NAT; and (d) transmitting the call connection request packet that is generated by changing the media receiving address information in the private IP format into the media receiving address information that is translated into the public IP received in (c) to a call receiving terminal.

In another aspect of the present invention, an application layer gateway (ALG) server, for routing a session initiation protocol (SIP) message so as to perform interworking between a local network using a private IP address and a public network using a public IP address, the local network configuring a node includes: a message receiver for checking a transmitting subject and a method of a received SIP message; a message translator for performing network address translation on the media receiving address information of the SIP message and real time control protocol (RTCP) receiving address information based on the checked result, and adding address information of the message translator to the routing path of the SIP message; and a message transmitter for transmitting the SIP message translated by the message translator to the next routing path of the SIP message.

In another aspect of the present invention, a network address translator for routing a SIP message, the network address translator being provided on the boundary of a local network using a private IP address and a public network using a public IP address includes: a packet analyzer for analyzing a received packet and checking whether the packet has a SIP message; and an application layer gateway driver for performing a network address translation on the media receiving and RTCP receiving address information by referring to a network address translation table for the SIP message, and including address information of the application layer gateway driver in the routing path of the SIP message to route the same to the corresponding destination.

In another aspect of the present invention, a SIP message routing method of a node for interworking between a local network using a private IP address and a public network using a public IP address includes: (a) checking a transmitting subject and a method of the received SIP message; (b) applying the network address translation following the checked message transmitting subject and the method to the media and RTCP receiving address information of the SIP message; (c) specifying the address of the node selected based on the checked message transmitting subject in routing path information of the SIP message, the routing path determining a routing path of the next request message; and (d) routing the SIP message to the corresponding destination address.

In another aspect of the present invention, an interworking system for a SIP service between a local network using a private IP address and a public network using a public IP address includes: a STUN server for providing public IP binding information of the private IP address that is translated through NAT; and an application layer gateway (ALG) server for providing media and RTCP receiving address information in the private IP format extracted from the SIP message received from a call transmitting terminal to the STUN server to receive address information that is translated into a public IP, applying the address information to the SIP message, and transmitting an applied result to a call receiving terminal.

In another aspect of the present invention, a SIP message routing method of a node for interworking between a local network using a private IP address and a public network using a public IP address includes: (a) transmitting a public IP binding request with changed header information to media and RTCP receiving address information in the private IP format extracted from the SIP message received from a call transmitting terminal; (b) receiving a public IP binding response including the header information translated into a public IP; and (c) applying the media and RTCP receiving address information translated into a public IP acquired from header information of the public IP binding response to the received SIP message, and transmitting an applied result to a call receiving terminal.

According to the exemplary embodiments of the present invention, the problem of the NAT-traversal on the protocol separately having a call setting and a data transmitting/receiving is solved by using the conventional NAT without greatly changing the conventional STUN protocol.

Also, when the STUN protocol is based on the server and the client, the STUN client function performed by the terminal is realized on the network node to thus minimize the load of the terminal and require no additional change or additional items on the existing terminal.

Further, required changing items in the SIP message are substantially provided in order to solve the NAT-traversal problem of the SIP-based service, and hence, the present invention is directly applicable to the development and realization of the corresponding node.

BRIEF DESCRIPTION OF THE SEVERAL VIEWS OF THE DRAWING(S)

FIG. 9 shows another detailed example of a SIP message routing method according to a second exemplary embodiment of the present invention.

FIG. 12 shows identification information for a SIP message transmitter and a method according to a second exemplary embodiment of the present invention.

DETAILED DESCRIPTION OF THE INVENTION

Figure 1:
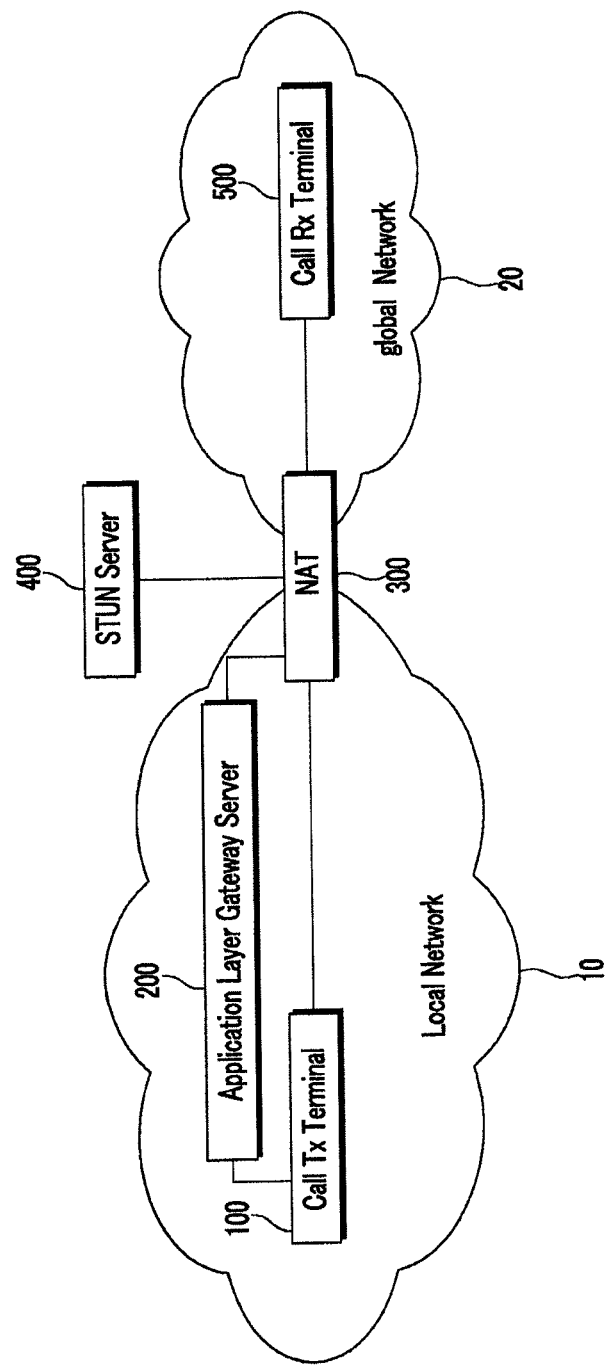
FIG. 1 is a schematic diagram of an interworking system between IP networks using different IP address format according to a first exemplary embodiment of the present invention.

In the following detailed description, only certain exemplary embodiments of the present invention have been shown and described, simply by way of illustration.

As those skilled in the art would realize, the described embodiments may be modified in various different ways, all without departing from the spirit or scope of the present invention.

Accordingly, the drawings and description are to be regarded as illustrative in nature and not restrictive.

Like reference numerals designate like elements throughout the specification.

Throughout this specification and the claims which follow, unless explicitly described to the contrary, the word "comprising" or variations such as "comprises" will be understood to imply the inclusion of stated elements but not the exclusion of any other elements.

Also, the term of a unit, a device, a module, and a block in the present specification represents a unit for processing a predetermined function or operation, which can be realized by hardware, software, or a combination of hardware and software.

An interworking system between IP networks using different IP address format, an application layer gateway (ALG) server, a network address translator, an interworking method thereof, and a SIP message routing method according to embodiments of the present invention will now be described with reference to drawings.

Interworking between networks using different IP address format for solving the NAT-traversal problem according to a first exemplary embodiment of the present invention will now be described.

FIG. 1 is a schematic diagram for an interworking system between IP networks using different IP address format according to a first exemplary embodiment of the present invention.

Referring to FIG. 1, a host (node) of the interworking system includes a call transmitting terminal 100, an application layer gateway (ALG) server 200, a network address translator 300, a STUN server 400, and a call receiving terminal 500.

The interworking system is realized in an IP network 1 including a local network 10 using a private IP address and a public network 20 using a public IP address.

The interworking system uses a protocol that includes a signaling process for setting a call and a media session process for transmitting/receiving data, and has a packet payload having negotiation information of the media session process.

In the protocol, the payload of the application has host information, and a media session negotiation is performed between an end host that is the call transmitting terminal 100, and the call receiving terminal 500.

In further detail, the host information represents media receiving information for the end hosts to actually transmit and receive multimedia data such as audio and video, that is, address information of the call transmitting terminal 100 and the call receiving terminal 500 for receiving media.

The call transmitting terminal 100 and the call receiving terminal 500 are end hosts on the communication line of the IP network 1.

In this instance, the terminal (call transmitting) 100 is provided in the local IP network 10 and receives a private IP address.

The terminal (call receiving) 500 may be a terminal that is provided on the public IP network 20 and has received a public IP address, or a terminal that is provided in another local IP network and has received a corresponding private IP address.

The application layer gateway (ALG) server 200 changes media receiving information in the private IP address format in the payload of the packet transmitted by the call transmitting terminal 100 into media receiving information in the public IP address format, and transmits the media receiving information in the public IP address format to the corresponding terminal (call receiving) 500.

That is, the application layer gateway (ALG) server 200 performs an application layer gateway (ALG) function.

In this instance, the public IP address is acquired by requesting binding information of the public IP from the STUN server 400 and receiving a binding response.

Therefore, the application layer gateway (ALG) server 200 functions as a STUN client for binding the public IP address.

In this instance, the binding request of the public IP address uses the IP masquerading technology.

The IP masquerading is a networking function by Linux, in which internal computers connected to a Linux box respectively receive a virtual IP address to allow Internet connection by use of a single IP address.

Therefore, when the IP masquerading is used, the header information of the binding request is changed into media receiving information in the private IP address format extracted from the payload of the packet received from the call transmitting terminal 100 and is transmitted to the application layer gateway (ALG) server 200.

A binding response received from the application layer gateway (ALG) server 200 includes a public IP address of the header information changed into the media receiving information in the private IP address format.

In this instance, the received binding information of the public IP address relates to the header information that is changed into the media receiving information, and hence, media receiving information in the public IP address format for the media receiving information in the private IP address format included in the packet payload is acquired.

Therefore, the application layer gateway (ALG) server 200 performs an IP masquerading function.

The network address translator (NAT) 300 is provided on the boundary of the local network 10 and the public network 20 to translate source address information in the private IP address format included in the header of the packet into source address information in the public IP address format.

Also, the NAT translates source address information in the public IP address format into source address information in the private IP format.

The source IP address information includes an IP address and a port.

In this instance, the address translation is allowable for the network layer and the transport layer that correspond to Layer 3 and Layer 4 with reference to the open system interconnection (OSI) model.

The STUN server 400 uses the STUN (Simple Traversal of User Datagram Protocol Through Network Address Translators) protocol to provide binding information of the public IP address to a STUN client.

That is, the STUN server 400 functions as a server corresponding to the client for binding the public IP address of the STUN server.

Therefore, on receiving a binding request from the application layer gateway (ALG) server 200, the STUN server 400 extracts header information of the packet that is translated into the public IP address while undergoing the process by the network address translator 300.

The STUN server 400 loads the header information in the binding response and transmits the same to the application layer gateway (ALG) server 200.

In this instance, the STUN server 400 checks a response receiving address of the binding request and transmits a binding response to the checked address, and it is desirable for the application layer gateway (ALG) server 200 to set the binding response address as an IP address of the application layer gateway G, server 200 in the case of the binding request.

Figure 2:
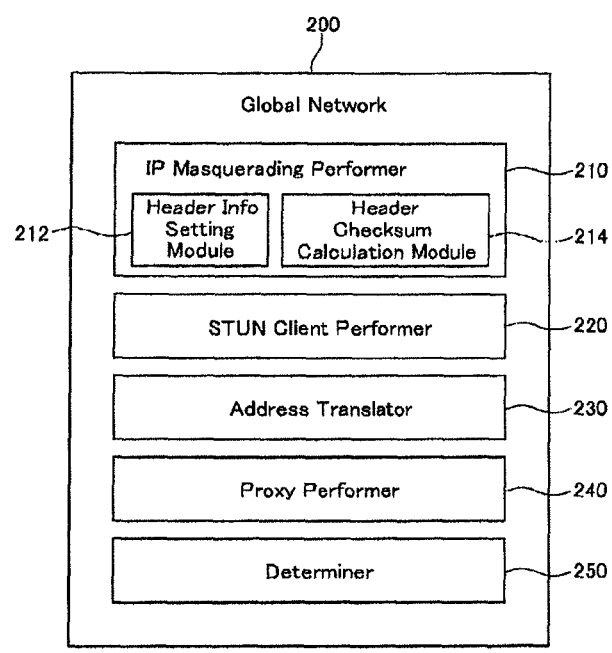
FIG. 2 is a detailed functional block schematic diagram of an application layer gateway (ALG) server according to a first exemplary embodiment of the present invention.

FIG. 2 is a detailed functional block schematic diagram for an application layer gateway (ALG) server in the interworking system of FIG. 1 according to a first exemplary embodiment of the present invention.

Referring to FIG. 2, the application layer gateway (ALG) server 200 includes an IP masquerading performer 210, a STUN client performer 220, an address translator 230, a proxy performer 240, and a determiner 250.

The IP masquerading performer 210 performs IP masquerading.

In detail, the IP masquerading performer 210 may include a header information setting module 212, and a header checksum calculation module 214.

The header information setting module 212 sets the media receiving information extracted from the payload of the packet received from the call transmitting terminal 100 to be header information of the packet for a binding request to be transmitted to the STUN server 400.

The setting of header information will now be described with reference to FIG. 3 and FIG. 4.

Figure 3:
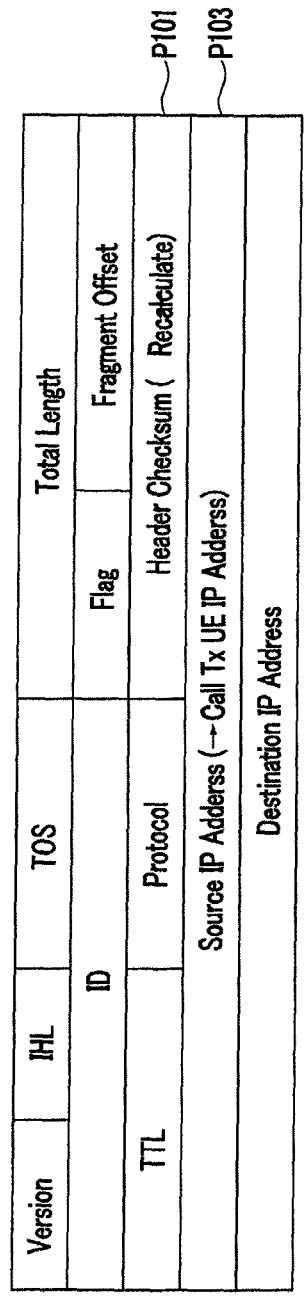
FIG. 3 shows an IP header set by an application layer gateway (ALG) server of FIG. 2.

Referring to FIG. 3 showing an IP header, the parameter "Source IP Address" (P103) is changed with media receiving information of the call transmitting terminal 100.

Figure 4:
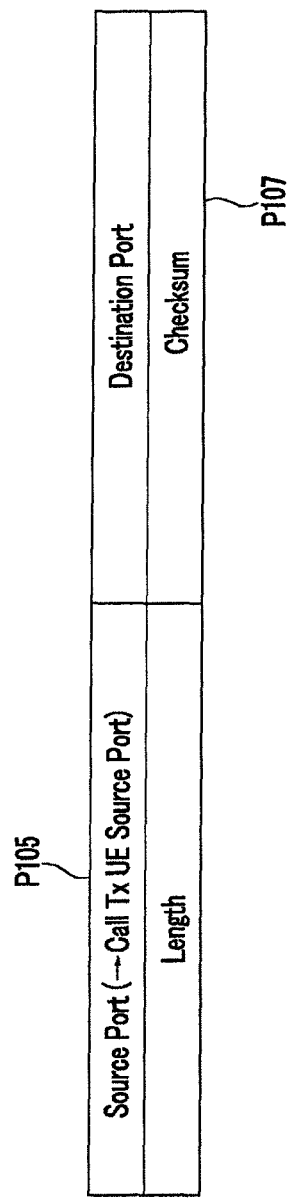
FIG. 4 shows a UDP header set by an application layer gateway (ALG) server of FIG. 2.

FIG. 4 shows a UDP header in which the parameter "Source port" (P105) is changed with the media receiving information of the call transmitting terminal 100.

In this instance, as described in FIG. 1, the media receiving information is an IP address for the call transmitting terminal 100 and the call receiving terminal 200 to receive media, and it is allocated as a private IP address.

The header checksum calculation module 214 recalculates the parameter "Header Checksum" (P101) of the IP header by applying the IP address changed by the header information setting module 212, and can also recalculate the parameter "Checksum" (P107) of the UDP header.

However, since the UDP layer does not recalculate the parameter "Checksum" (P107), the recalculation is not always needed The STUN client performer 220 functions as a client corresponding to the STUN server 400 for providing binding information of the public IP address.

That is, the STUN client performer 220 transmits a packet for a binding request with the header information changed by the IP masquerading performer 210 to the STUN server 400.

In this instance, the STUN client performer 220 sets a response address of the binding request to be an IP address of the application layer gateway (ALG) server 200, and transmits the same.

On receiving a binding response from the STUN server 400, the STUN client performer 220 extracts public IP binding information of header information from the binding response.

The address translator 230 functions as an application layer gateway for changing the media receiving information in the private IP address format included in the payload of the packet into media receiving information in the public IP address format.

That is, the address translator 230 changes the media receiving information in the private IP address format into the public IP binding information of the header information extracted by the STUN client performer 220.

In this instance, since the header information is given when it is changed with the media receiving information in the private IP address format by the IF masquerading performer 210, corresponding public IP binding information corresponds to the media receiving information in the public IP address format.

Also as shown in FIG. 2, the application layer gateway (ALG) server 200 may include a proxy performer 240.

The proxy performer 240 performs a call repeating function.

That is, the proxy performer 240 performs a proxy function of receiving a call connection request from the call transmitting terminal 100, transmitting the call connection request to the call receiving terminal 500, receiving a call connection response from the call receiving terminal 500, and transmitting the call connection response to the call transmitting terminal 100.

In this instance, the call connection request transmitted to the call receiving terminal 500 is a packet that is provided by the address translator 230 and is generated by translating the media receiving address information of the payload into the public IP address.

Also, as shown in FIG. 2, the application layer gateway (ALG) server 200 may include a determiner 240.

The determiner 240 interworks with the IP masquerading performer 210 and the proxy performer 240.

The determiner 240 checks the destination of the received packet header to determine whether the network of the call transmitting terminal 100 corresponds to the network of the call receiving terminal 500 and then determines whether to perform IP masquerading.

In this instance, when it is determined to perform IP masquerading, the determination is provided to the IP masquerading performer 210.

Therefore, according to the above-noted configuration of the application layer gateway (ALG) server 200, the STUN client performer 220 performs a client function of the public IP binding, and determines whether to perform public IP binding by control of the determiner 240.

Accordingly, the public IP binding is not performed on the same network on which no address translation is required before negotiation of a communication session is finished.

Figure 5:
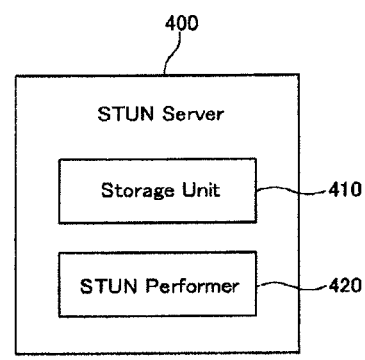
FIG. 5 is a detailed functioned block schematic diagram for a STUN server according to a first exemplary embodiment of the present invention.

FIG. 5 is a detailed functioned block schematic diagram for a STUN server in the interworking system of FIG. 1.

Referring to FIG. 5, the STUN server 400 functions as a server for the public IP binding.

In detail, the STUN server 400 may include a storage unit 410 and a STUN performer 420.

The storage unit 410 stores setting information for processing the public IP binding by interworking with the application layer gateway (ALG) server 200, particularly the STUN client performer 220.

The STUN performer 420 extracts public IP address information translated by the network address translator 300 from the header information of the public IP binding request received from the STUN client performer 220 according to the setting information of the storage unit 410.

Also, the STUN performer 420 extracts the set response address from the response address information of the public IP binding, loads the extracted public IP address information in the public IP binding response, and transmits the public IP address information to the extracted response address.

Figure 6:
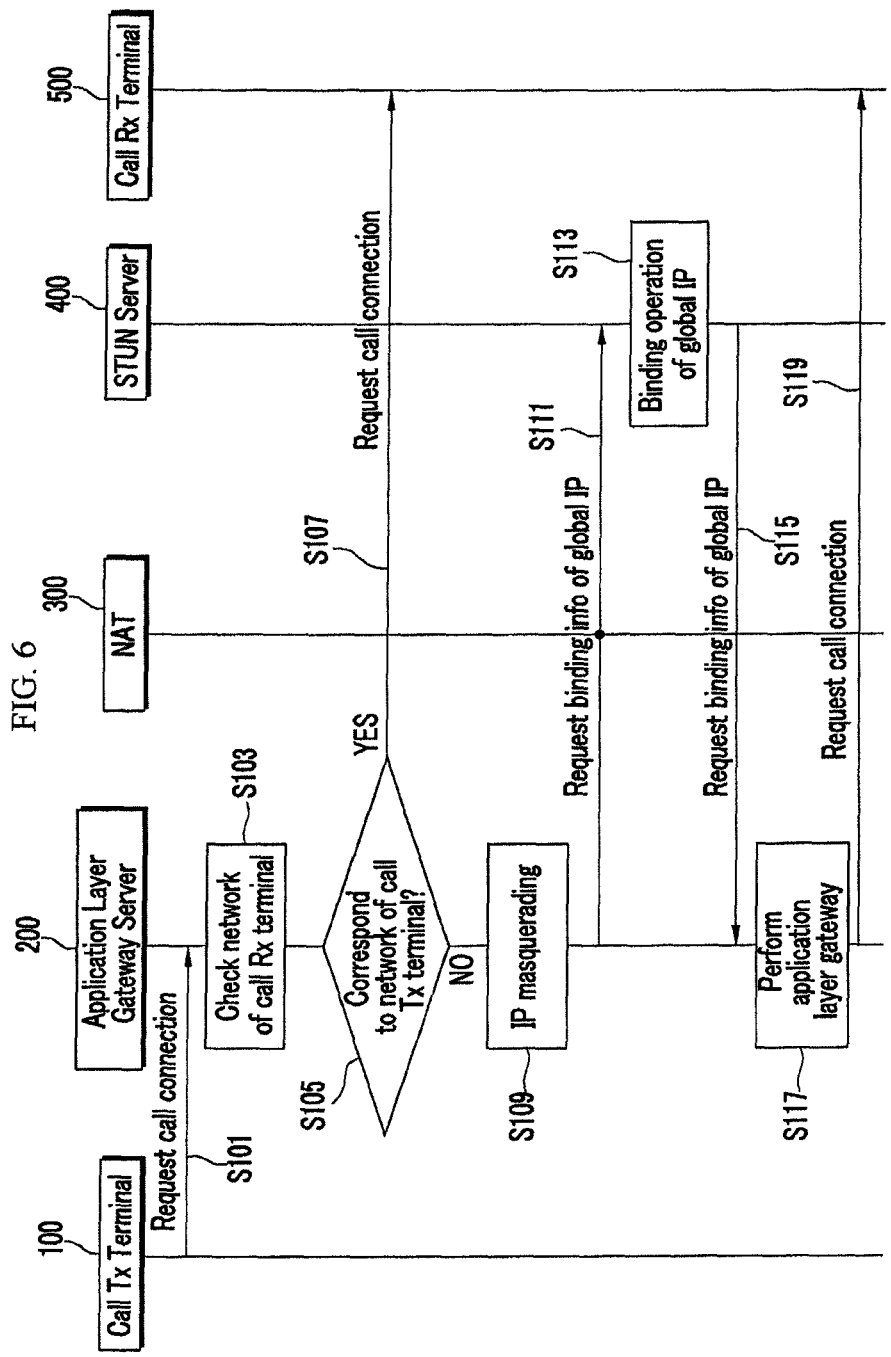
FIG. 6 shows an interworking method between IP networks using different IP address format according to a first exemplary embodiment of the present invention.

FIG. 6 shows an interworking method between IP networks using different IP address format according to a first exemplary embodiment of the present invention.

On receiving a private IP address, the call transmitting terminal 100 transmits a call connection request to the application layer gateway (ALG) server 200 (S101).

Steps of S103, S105, and S107 can be further included before the step S109.

The application layer gateway (ALG) server 200 determines (S103) whether the call transmitting terminal 100 and the call receiving terminal 500 are provided on the same network from the call connection request received in S101.

The application layer gateway (ALG) server 200 determines the network state by comparing the IP address specified in the destination (that corresponds to the parameter "Destination IP Address" of the IP header) of the call connection request and the IP address specified in the source (that corresponds to the parameter "Source IP Address" of the IP header).

Since there is no need to perform the network address translator 300 when the call transmitting terminal 100 and the call receiving terminal 500 are provided on the same network requiring no IP address translation according to the determination result of S103, the call connection request of the ca fl transmitting terminal 100 is transmitted to the call receiving terminal 500 (S107).

Since there is a need to change the IP address when the call transmitting terminal 100 and the call receiving terminal 500 are provided on the different networks according to the determination result of S103, it is determined to perform the IP masquerading.

The application layer gateway (ALG) server 200 performs IP masquerading (S109).

That is, the application layer gateway (ALG) server 200 extracts media receiving information from the payload of the packet for the call connection request received in S101, changes the media receiving information with header information of the packet for the public IP binding request to be transmitted to the STUN server 400, and transmits the IP masqueraded public IP binding request to the STUN server 400 (S111).

In this instance, the public IP binding request includes response address information that is set to be an IP address of the application layer gateway (ALG) server 200.

The STUN server 400 performs a public IP binding operation (S113).

That is, STUN server 400 extracts header information translated into the public IP address from the public IP binding request received through the network address translator 300, and includes the extracted header information in the public IP binding response.

The STUN server 400 uses the IP address of the application layer gateway (ALG) server 200 included in the response address information of the public IP binding request to transmit a public IP binding response to the application layer gateway (ALG) server 200 (S115).

The application layer gateway (ALG) server 200 receives the public IP binding response and performs an application layer gateway function (S117).

That is, the application layer gateway (ALG) server 200 changes the media receiving information of the payload of the call connection request received in S101 into header information changed into the public IP address extracted from the binding response.

The application layer gateway (ALG) server 200 transmits the call connection request that is generated by changing media receiving information of the packet payload into the public IP address format to the call receiving terminal 500 through the network address translator 300 (S119), and receives a call connection response from the call receiving terminal 500 (S121), and hence, a call connection is provided between the call transmitting terminal 100 and the call receiving terminal 500.

Accordingly, when the network address translator 300 translates header information of the call connection request into the public IP address, media session negotiation is fluently performed since the media receiving information is translated into the public IP address format through the steps of S109, S111, S113, S115, and S117.

SIP routing between networks using different IP address format for solving the NAT-traversal problem according to a second exemplary embodiment of the present invention will now be described.

Figure 7:
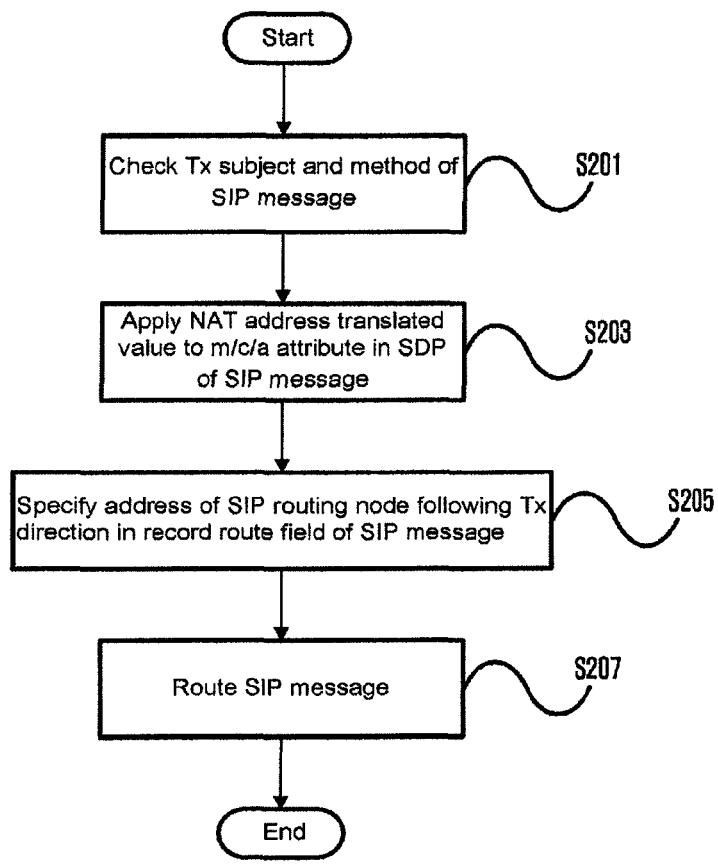
FIG. 7 shows a brief SIP message routing method according to a second exemplary embodiment of the present invention.

FIG. 7 shows a brief SIP message routing method according to a second exemplary embodiment of the present invention.

Referring to FIG. 7, a message transmission subject and a method of the received SIP message are checked (S201).

The message transmission subject represents a call transmitting/receiving subject, and the method indicates whether a message is a request message or a response message.

In this instance, the SIP message includes a request message and a response message.

A network address translation appropriate for the contents checked in S201 is applied to the media and real time control protocol (RTCP) receiving address information of the received SIP message (S203).

That is, the network address translation is performed according whether the transmitting subject of the received SIP message is a local network or a public network and whether the message is a request message or a response message.

Also, a network address translation can be performed on transport information of the SIP message, which is not always needed since a public IP address is allocated to the SIP message routing node.

Here, the transport includes a subject having transmitted the SIP message, that is, a host name or network address information of the SIP client.

An address of the node appropriate for the contents checked in S201, that is, an address of the node for performing SIP message routing, is included in the routing path of the SIP message (S207).

In this instance, the routing path determines a route path of the next request message (e.g., UPDATE and PRACK).

The subsequently received SIP message receives a SIP service request message by using a private IP address of the node according to the determined routing path when the transmitting subject is a local network.

Also, the subsequently received SIP message receives a SIP service request message by using a public IP address of the node when the transmitting subject is a public network.

The SIP message translated through the steps of S203 and S205 is routed to the corresponding destination address (S207).

A SIP message routing method depending on the SIP message transmitting subject and the method will now be described in detail.

Figure 8:
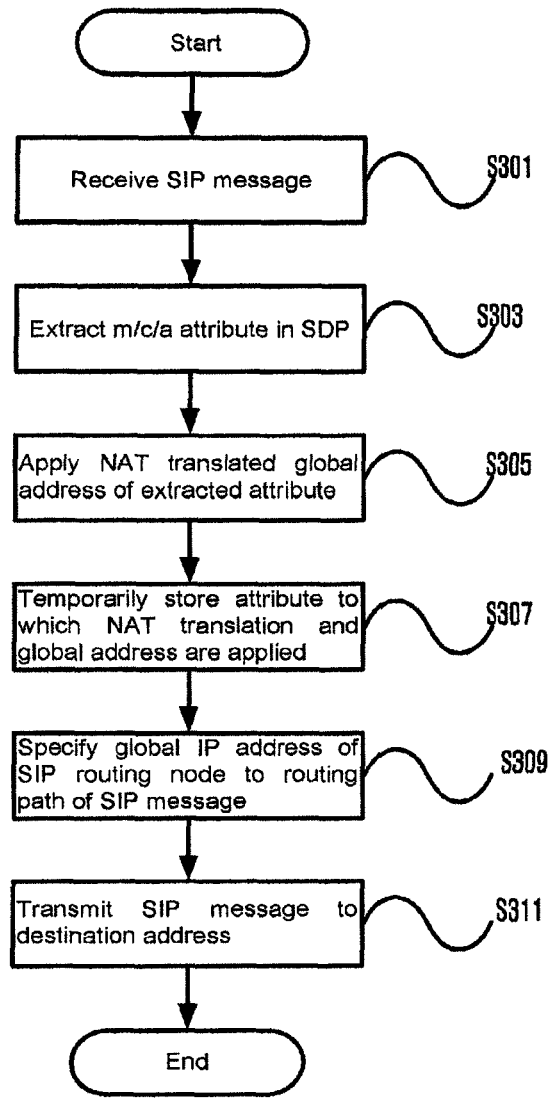
FIG. 8 shows a detailed example of a SIP message routing method according to a second exemplary embodiment of the present invention.

FIG. 8 shows a detailed example of a SIP message routing method according to a second exemplary embodiment of the present invention, showing 'Case 1' (P201).

Referring to FIG. 8, an SIP message having a local network as a message transmitting subject and a session invite request as a method is received (S301).

The media and RTCP address allocated from the place of dispatch specified in the session description protocol (SDP) field of the SIP message received in S301 are extracted (S303).

In this instance, the extracted address is an IP of the address of the place of dispatch, that is, it has a private IP format.

The public IP address for the address extracted in S303 is allocated and translated (S305).

The address allocation information performed in S305 is temporarily stored (S307).

The public IP address of the node performing SIP routing is specified in the routing path of the SIP message translated in S307 (S309).

The SIP message in which the routing path is specified in S309 is transmitted to the destination address (S311).

In this instance, a public IP address can be allocated by using a network address translation table in S305.

Also, the public IP address can be allocated by using a query method using a server.

The query method using an external server can use a STUN protocol.

In this instance, the public IP address allocation process using the STUN protocol changes the media and RTCP receiving address of the SIP message into IP header information of the STUN binding message to acquire a corresponding NAT binding value.

FIG. 9 shows a detailed SIP message routing method according to a second exemplary embodiment of the present invention, showing the 'Case 2' (P203).

Referring to FIG. 9, a SIP message having a public network as a message transmitting subject and a session invite response as a method is received (S401).

The media and the RTCP address corresponding to the place of dispatch specified in the SDP field of the SIP message received in S401 are extracted (S403).

A private IP address of the address extracted in S403 is searched to map the private IP address on the extracted address and store a result in the SIP address allocation table (S405).

A private IP address of the node for performing SIP message routing is inserted (S407) in the routing path of the SIP message having undergone the step of S405.

The SIP message having undergone the step of S407 is transmitted to the destination address (S409).

Figure 10:
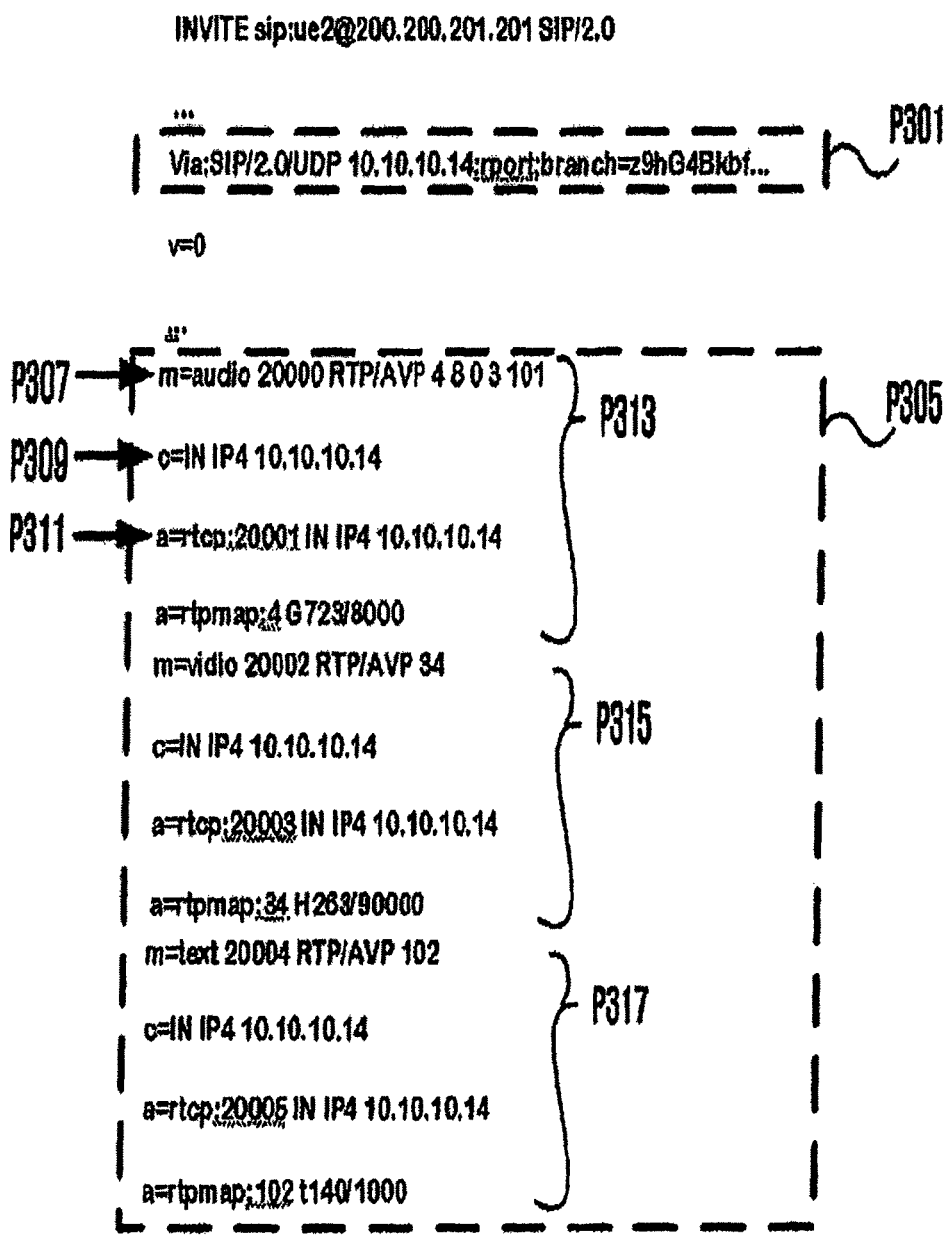
FIG. 10 and FIG. 11 show comparison between a pre-translation SIP message and a post-translation SIP message for SIP message routing according to a second exemplary embodiment of the present invention.
Figure 11:
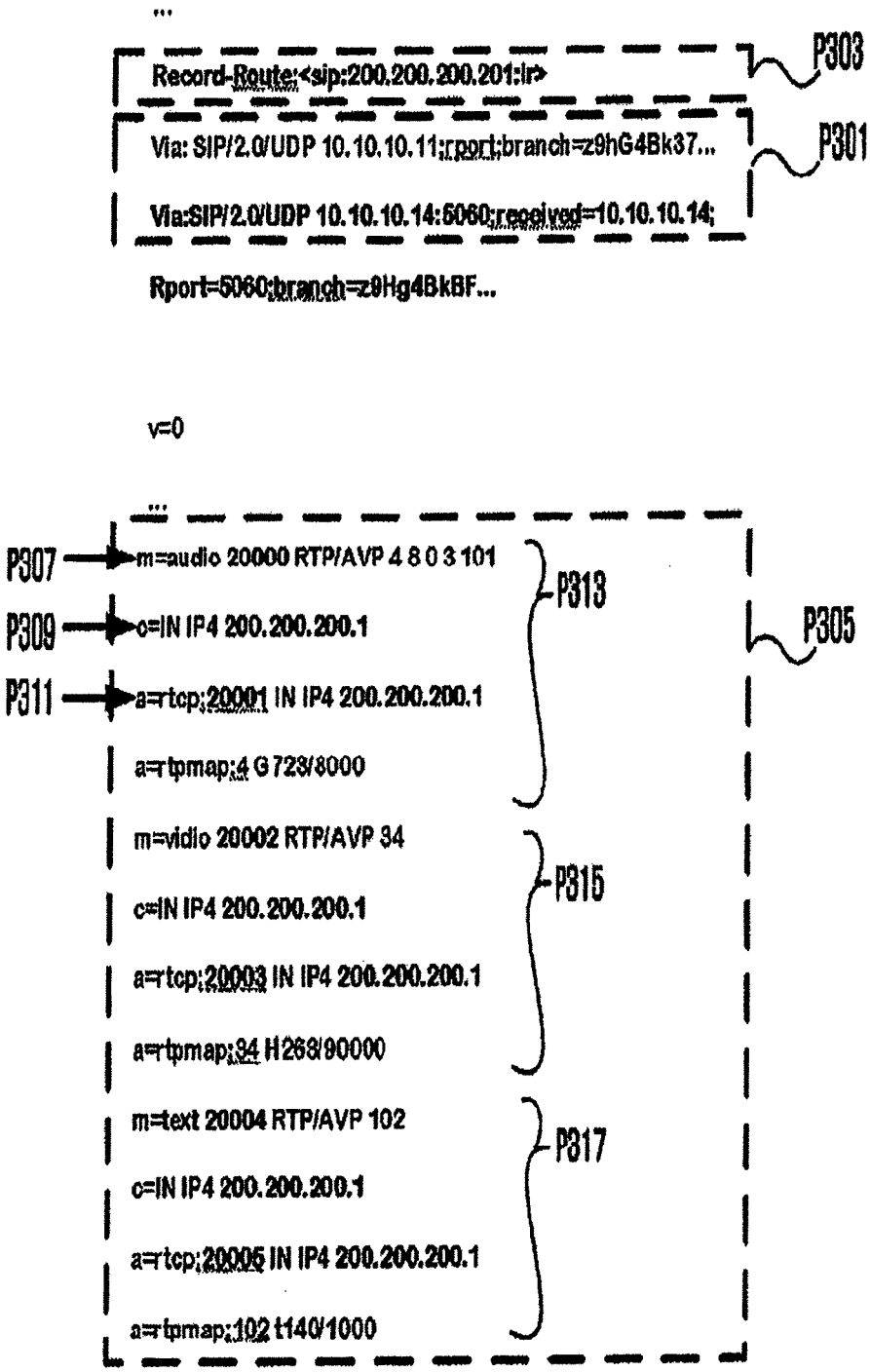

FIG. 10 and FIG. 11 show comparison between a pre-translation SIP message and a post-translation SIP message for SIP message routing according to a second exemplary embodiment of the present invention, showing the 'Case 1' (P201).

When FIG. 10 and FIG. 11 are compared, the field that is translated for routing in the SIP message includes an SDP field (P305), a via header field (P301), and a record-route field (P303).

In detail, the SDP field (P305) translates the 'media receiving port (attribute m)' field (P307), the 'media receiving IP address (attribute c)' field (P309), and the 'RTCP receiving IP address and port (attribute a)' field (P311).

The 'media receiving port (attribute m)' field (P307) stores the media receiving port value allocated by the place of dispatch as a translated value using a network address translation technology.

In this instance, the translation is performed for the respective media types including audio, video, and text (P313, P315, and P317), which is needed to make the media be receivable from the external network, that is, the public network.

The 'media receiving IP address (attribute c)' field (P309) is changed to a value that is translated from the media receiving IP address allocated by the place of dispatch using the network address translation technology.

In a like manner, the translation is performed for the respective media types including audio, video, and text (P313, P315, and P317), which is needed to make the media be receivable from the external network, that is, the public network.

The 'RTCP receiving IP address and port (attribute a)' field (P311) is changed to a value that is translated from the RTCP receiving IP address and port value allocated by the place of dispatch using the network address translation technology.

In this instance, the translation is performed for the respective media types including audio, video, and text (P313, P315, and P317), which is needed to make the RTCP receiving be available from the external network, that is, the public network.

Compared to FIG. 10, translated portions of the respective fields (P307, P309, and P311) of FIG. 11 are given bold type letters.

The via header field (P301) supports the report function in the via header, and the message transmitted from the call transmitting terminal includes the 'rport' parameter.

In this case, it is desirable to extract the 'IP address' of the via header field including the 'rport' parameter and the 'source port' of the message and specify the same on the 'received' parameter and the 'rport' parameter to thus rewrite the via header.

Sine the node for performing SIP message routing has a public IP address appropriately mapped by the NAT, the address translation of the node performing SIP message routing is not an imperative operation.

The record-route field (P303) is a field for specifying a proxy address depending on the message transmitting subject so as to make routing of the next request (e.g., UPDATE and PRACK) message possible.

In this instance, the record-route field is needed since the next request message is to be routed so as to pass through the node for performing a SIP ALG function.

The message transmitted from the local network to the public network specifies a public IP address depending on the message transmitting subject.

Also, the message transmitted from the public network to the local network specifies a private IP address.

When FIG. 10 and FIG. 11 are compared, the media receiving address (private) is 10.10.10.14 (audio: 20000, video: 20002, text: 20004).

The media receiving address (global) is 200.200.200.1 (audio: 20000, video: 20002, text: 20004).

The rtcp receiving address (private) is 10.10.10.14 (port: 20001) and the rtcp receiving address (global) is 200.200.200.1 (port: 20001), which represents that the private receiving address is 10.10.10.14 (ports are audio: 20000, video: 20002, and text: 20004) and the translated value of the IP address/port using the network address translation technology is 200.200.200.1 (ports are audio: 20000, rtcp: 20001, video: 20002, text: 20004) since the call transmitting terminal (ue1) has a private IP address.

The (private) address of the node for performing routing on the SIP message is 10.10.10.11 and the (global) address is 200.200.200.201.

Figure 13:
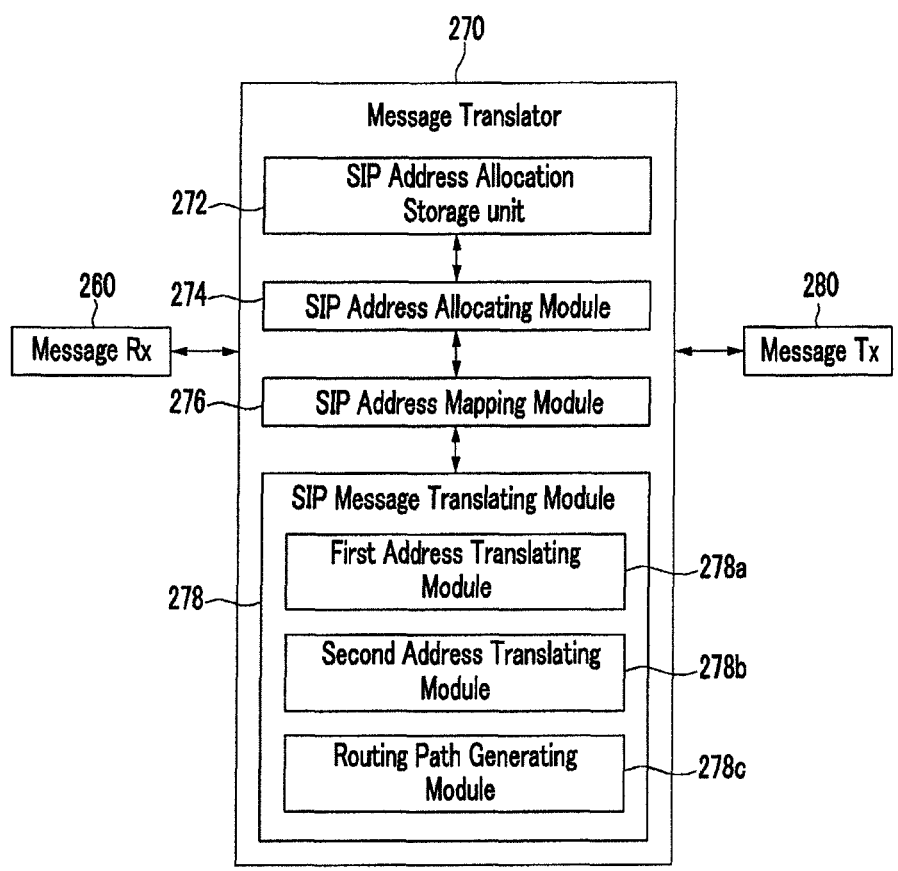
FIG. 13 is a block diagram for an application layer gateway (ALG) server for performing SIP message routing according to a second exemplary embodiment of the present invention.

FIG. 13 is a block diagram for an application layer gateway (ALG) server for performing SIP message routing according to a second exemplary embodiment of the present invention, showing a configuration of a node for performing SIP message routing described with reference to FIG. 7 to FIG. 12.

The configuration of the network including the application layer gateway (ALG) server corresponds to that shown in FIG. 1.

In this instance, the detailed configuration of the application layer gateway (ALG) server will be described with reference to FIG. 13.

Referring to FIG. 13, the application layer gateway (ALG) server (200 in FIG. 1) includes a message receiver 260, a message translator 270, and a message transmitter 280.

The message receiver 260 receives a SIP message to check the message transmitting subject and a method.

The message translator 270 performs a network address translation on the SIP message media and RTCP receiving address information based on the checked contents of the message receiver 260, and includes address information of the node in the SIP message routing path.

In this instance, the message translator 270 includes a SIP address allocation storage module 272, a SIP address allocation module 274, a SIP address mapping module 276, and a SIP message translation module 278.

The SIP address allocation storage module 272 stores mapped the network address pre/post-translation information.

The SIP address allocation module 274 performs a public IP allocation on the media of the received SIP message having the local network as a transmitting subject and a session invite request as a method and host information on RTCP receipt.

The SIP address mapping module 276 maps the media of the SIP message having the public network as a transmitting subject and a response to the session invite request as a method and host information for RTCP receipt on SIP address pre-allocation information by the SIP address allocation module 274 and stores a mapped result in the SIP address allocation storage unit 222.

The SIP message translation module 278 performs an appropriate SIP address translation in cooperation with the SIP address allocation module 274 and the SIP address mapping module 276, specifies the public IP address of the application layer application layer gateway (ALG) server 200 on the routing path of the session invite request message, and specifies a private IP address of the application layer application layer gateway (ALG) server 200 on the routing path of the response message for the session invite request.

The SIP message translation module 278 includes a first address translation module 278a, a second address translation module 278b, and a routing path generating module 278c.

The first address translation module 278a performs an address translation on the SIP message media and host information for RTCP receipt.

The second address translation module 278b performs an address translation on the transport information of the SIP message.

Here, the transport includes a host name or a network address of the transmitting subject.

The routing path generating module 278c generates the routing path of the response for the SIP service request message as a public IP address or a private IP address of the application layer application layer gateway (ALG) server 200 according the message transmitting subject.

The message receiver 260 receives a service request message or a service response message by using the private IP address or the public IP address.

The message transmitter 280 transmits the message translated by the message translator 270 to an appropriate routing path.

Figure 14:
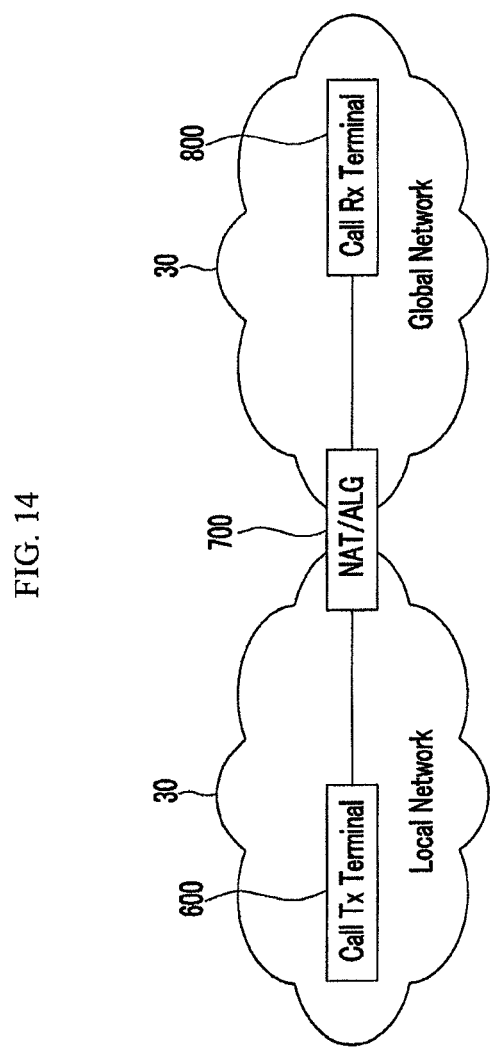
FIG. 14 shows a SIP-based network interworking schematic according to a second exemplary embodiment of the present invention.

FIG. 14 shows a SIP-based network interworking schematic diagram according to another second exemplary embodiment of the present invention, showing an application of the SIP message routing method described with reference to FIG. 7 to FIG. 12 to the existing the network address translation technology.

In this instance, the NAT uses a network address translation table.

Referring to FIG. 14, the SIP-based network interwork schematic diagram includes a call transmitting terminal 600, a network address translator 700, and a call receiving terminal 800.

The call transmitting terminal 600 and the call receiving terminal 800 will not be described since they correspond to the above-described technology.

The network address translator 700 is provided on the boundary of the local network 30 and the public network 40 to perform a network address translation function, and performs a SIP application layer gateway function to enable the SIP-based network interworking.

The detailed configuration of the network address translator 700 will now be described referring to FIG. 15.

Figure 15:
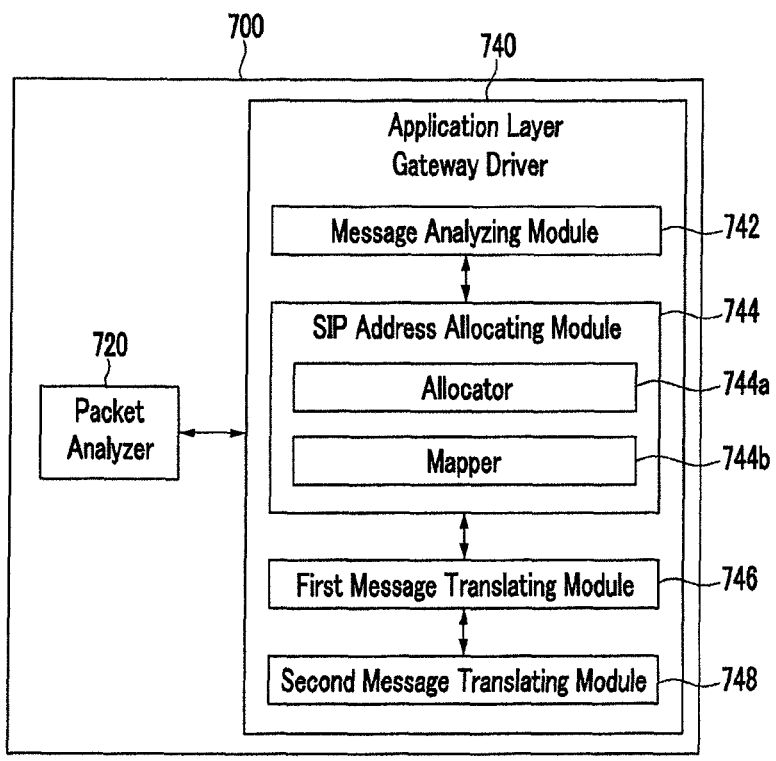
FIG. 15 is a detailed block diagram of a NAT according to a second exemplary embodiment of the present invention.

Referring to FIG. 15, the network address translator 700 includes a packet analyzer 720 and an application layer gateway driver 740.

The packet analyzer 720 analyzes the received packet to check whether it is a SIP message by analyzing an address of the place of generation and a port number of the packet.

That is, the SIP message can be checked by using the port number since the SIP uses the port number of 5060 as a default.

When the message is found to be a SIP message according to the checking result by the packet analyzer 720, the application layer gateway driver 740 refers to the network address translation table to perform a network address translation on the host information for receiving media and RTCP, includes address information of the application layer gateway driver 740 in the routing path, and routes to the corresponding destination.

In this instance, when the received packet is not a SIP message, the application layer gateway driver 740 translates the IP header or other additional components in a like manner of other packets to transmit them to an upper layer, thereby performing the existing NAT operation.

Here, the application layer gateway driver 740 includes a message analysis module 742, a SIP address allocation module 744, a first message translation module 746, and a second message translation module 748.

The message analysis module 742 analyzes the method and message transmitting subject of the SIP message transmitted from the packet analyzer 710.

The SIP address allocation module 744 performs SIP address allocation and mapping appropriate for the analyzing method and message transmitting subject by using the network address translation table.

The SIP address allocation module 744 includes an allocator 744a and a mapper 744b.

The allocator 744a allocates a public IP corresponding to the SIP message's media and RTCP receiving address information by using the network address translation table.

The mapper 744b maps the allocated public IP address and the pre-allocated private IP address for the media and RTCP address information to configure a SIP address allocation table.

The first message translation module 746 performs a SIP message translation by using the address allocated by the SIP address allocation module 744.

In this instance, it is possible to apply the allocated public IP to transport information of the SIP message, that is, information including one of a host name or a network address of the transmitting subject.

The second message translation module 748 includes the public IP address of the second message translation module 748 in the routing path when the transmitting subject of the SIP message is a local network, and it includes the private IP address of the second message translation module 748 in the routing path when the transmitting subject is a public network.

Referring to FIG. 7 to FIG. 15, needed translation items of the SIP message header are minimized to include the parameters 'm' and 'c' of the address SDP, the parameters 'a' of the RTCP, and the 'record-route' parameter.

Therefore, the SIP-based network interwork can be realized between the local network and the public network without translating a plurality of fields such as Request-URI, Via, Contact, Route, From, To, Error-info, Proxy-authenticate, WWW-authenticate, and Warning of the SIP message.

SIP message routing using a STUN protocol between the IP networks using different IP address format according to a third exemplary embodiment of the present invention will now be described.

Figure 16:
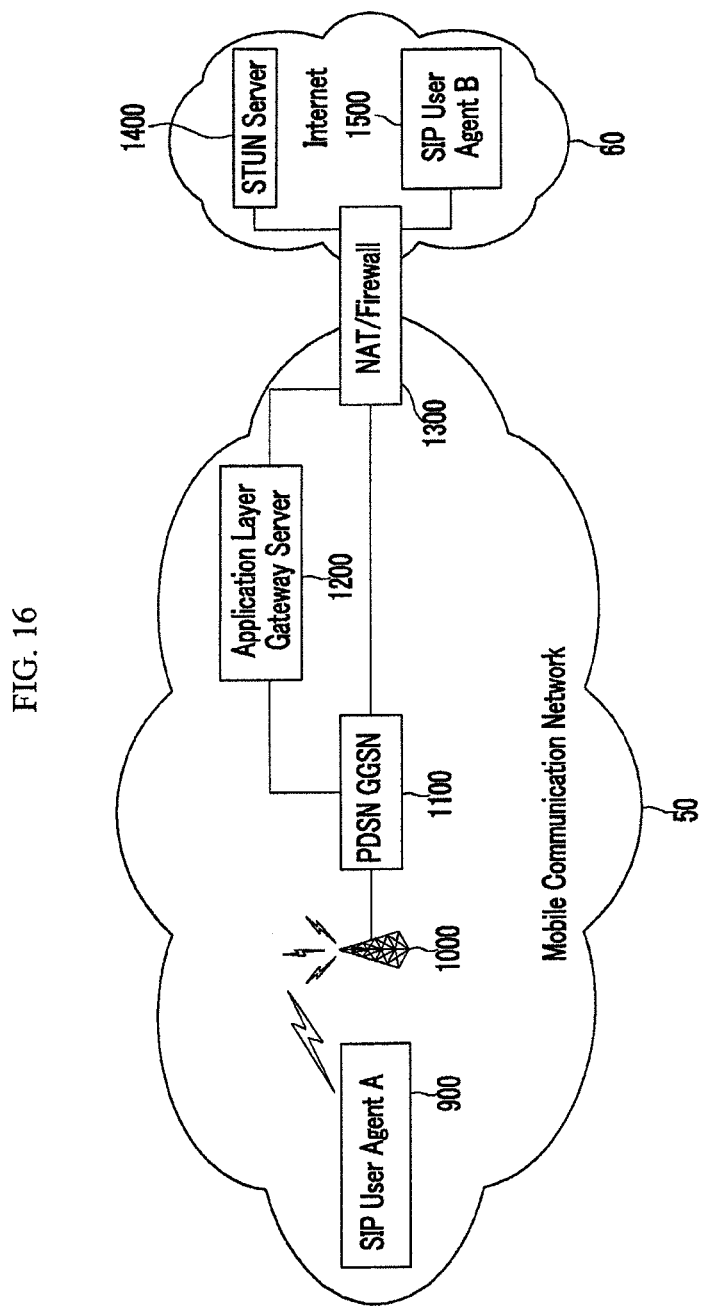
FIG. 16 is a schematic diagram for an interworking network according to a third exemplary embodiment of the present invention.

FIG. 16 is a schematic diagram for an interworking network configuration between IP networks using different IP address format according to a third exemplary embodiment of the present invention.

Referring to FIG. 16, a SIP user agent A 900 is provided on the mobile communication network 50 and is connected to the radio access network (RAN).

The radio access network includes a base station 1000 and a packet data serving node (PDSN)/gateway GPRS serving node (GGSN) 1100 and represents a network connected to the SIP user agent A 900 through a radio network.

The base station 1000 converts the analog signal received from the SIP user agent A 900 in the service cell into a digital signal and transmits the digital signal to the PDSN/GGSN 1100 connected through a cable, and converts the digital signal received from the PDSN/GGSN 1100 into an analog signal to transmit the same to the SIP user agent A 900.

The PDSN/GGSN 1100 performs IP address allocation/management/routing.

That is, the PDSN/GGSN 1100 translates the digital signal received from the base station 1000 into an IP packet and transmits the IP packet to the Internet 60, and translates the IP packet received from the Internet 60 into a digital signal and transmits the same to the base station 1000.

Therefore, the SIP user agent A 900 can exchange the IP packet type SIP message with the SIP user agent B 1500 through the radio access network.

The application layer gateway (ALG) server 1200 performs a SIP application level gateway (ALG) function, an IP masquerading function, a STUN client function, and a SIP proxy function.

The SIP ALG function is an ALG function for allocating and translating a source IP address and a source port of the SIP message into an IP format that is call receivable from the Internet.

In detail, address/port information in the "m(media)/c(connection) line" in the content (SDP unit) of the invite message is translated into an IP format available for interworking with the Internet 60 by setting an IP address and a port of the SIP user agent A 600 to the packet through the IP masquerading function.

The STUN client function requests a public IP address (IP address and port) from the STUN server 1400 and receives the same so that the SIP user agent A 900 may receive media from the Internet 60, which is called a STUN binding operation.

The SIP proxy function performs a proxy server between the SIP user agents A and B (900, 1500).

The above-configured application layer gateway (ALG) server 1200 solves the NAT-traversal problem by using the SIP message in the case of interworking with the Internet 60, and minimizes the terminal load since the STUN client is provided as an additional device not on the SIP user agent A 900 but on the node.

Further, the application layer gateway (ALG) server 1200 can perform the STUN binding operation after receiving the invite message so that a session connection is available without STUN binding when the SIP user agent B 1500 is on the mobile communication network 60, which prevents the call processing problem and the radio channel waste caused by performing a STUN binding operation irrespective of the network on which the call receiving SIP user agent is located as a STUN client is installed in the terminal.

The NAT 1300 allocates and translates a source IP address and a source port of the packet into a public IP so that call receiving may be possible in the case of interworking the mobile communication network 50 and the Internet 60.

The STUN server 1400 is provided outside the NAT 1300.

The STUN server 1400 notifies the STUN client, that is, the application layer gateway (ALG) server 1200 of a public IP address and a port allocated by the NAT 1300 when the SIP-user agent A 900 provided on the mobile communication network 30 interworks with the Internet 60.

Figure 17:
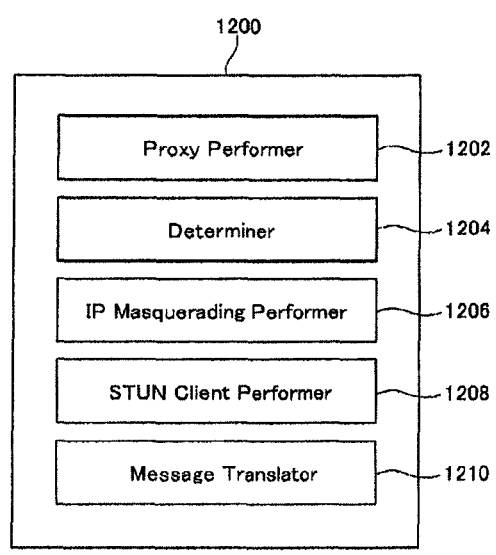
FIG. 17 shows a block diagram for an application layer gateway (ALG) server according to a third exemplary embodiment of the present invention.

FIG. 17 shows a block diagram for an application layer gateway (ALG) server according to a third exemplary embodiment of the present invention.

Referring to FIG. 17, the application layer gateway (ALG) server (1200 of FIG. 16) includes a proxy performer 1202, a determiner 1204, an IP masquerading performer 1206, a STUN client performer 1208, and a message translator 1210.

The proxy performer 1202 performs a proxy function of the SIP message.

The determiner 1204 determines the network and message types by checking the transmitting subject and the method of the received SIP message, thereby determining whether the network of the call transmitting terminal corresponds to the network of the call receiving terminal, and determining whether the SIP message is a request message or a response message.

The IP masquerading performer 1206 changes header information of the public IP binding request to be transmitted to the STUN server (1400 of FIG. 16) with the attribute value of m/c/a extracted from the SDP of the SIP message.

In this instance, the attribute value of m/c/a includes media and RTCP receiving address information.

The IP masquerading performer 1206 changes the source IP address and the source port of the header information of the public IP binding request with the attribute value of m/c/a of the received SIP message.

In this instance, the changing process is performed when the network of the call transmitting terminal is different from that of the call receiving terminal and the received SIP message is a session invite request message based on the determination result of the determiner.

The STUN client performer 1208 transmits the public IP binding request with the header information changed by the IP masquerading performer 1206 to the STUN server, and receives a public IP binding response including changed header information bound with the public IP.

The message translator 1210 acquires the attribute value of m/c/a translated into the public IP from the changed header information received by the STUN client performer 1208, and applies the attribute value of m/c/a to the received SIP message.

Also, the message translator 1210 selects one of the public IP address and the private IP address of the message translator 1210 that are selected based on the transmitting subject of the SIP message determined by the determiner 1204, and describes the selection result on the routing path of the SIP message.

The routing path determines the routing path of the next request message.

Figure 18:
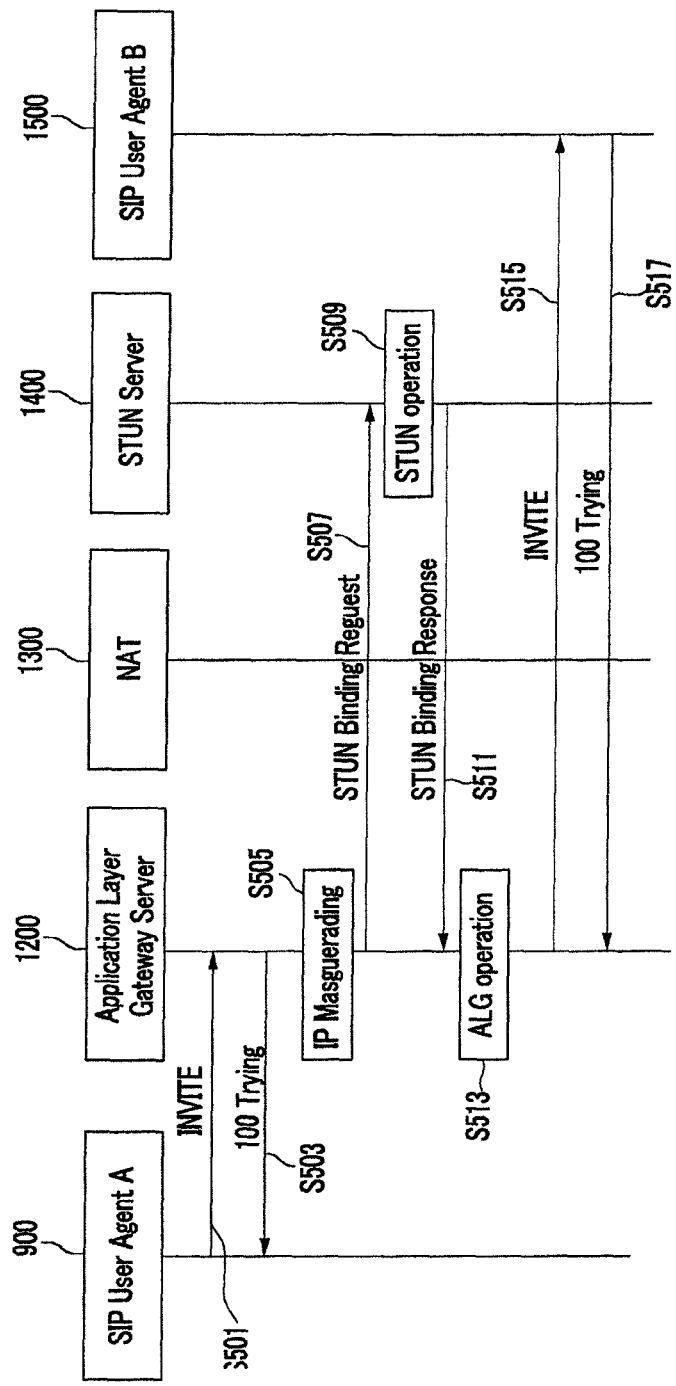
FIG. 18 shows a flowchart for SIP message transmission according to a third exemplary embodiment of the present invention.

FIG. 18 shows a flowchart for SIP message transmission according to a third exemplary embodiment of the present invention, showing a call flow for a session negotiation between the SIP user agents A and B (900 and 1500 of FIG. 16).

Session negotiation is performed by using a SIP message including "INVITE", "100 Trying", "183 Session Progress", "PRRACK", "200 OK", and "ACK".

FIG. 18 shows an "INVITE" message exchange.

Referring to FIG. 18, the application layer gateway (ALG) server (1200 of FIG. 16) receives an "INVITE" message from the SIP user agent A 900 (S501), and transmits a "100 Trying" message that is a receipt response to the "INVITE" message (S503).

The application layer gateway (ALG) server 1200 performs an IP masquerading operation (S505) according to the method and the transmitting subject of the message received in the step of S501.

Since the message received in the step of S501 is an "INVITE" message, the application layer gateway (ALG) server 1200 extracts the IP address and the port values specified in the m(media)/c(connection) line of the SDP included in the body of the message, inserts the extracted value instead of the header information of the "STUN Binding-Request" message for requesting public IP binding, and inserts a "Response-Address" that is set as an IP address of the application layer gateway (ALG) server 1200 into the "STUN Binding-Request" message.

The application layer gateway (ALG) server 1200 transmits the "STUN Binding-Request" message having undergone the step of S505 to the STUN server (1400 of FIG. 16) (S507).

The STUN server 1400 performs a STUN operation (S509) by using header information of the "STUN Binding-Request" message received in the step of S507.

That is, the STUN server 1400 extracts a "Source-IP-Address" of the IP header that is passed through the NAT 1300 and is translated and a "Source-Port" in the UDP header from the "STUN Binding-Request" message, and specifies the extracted result in the "Mapped-Address" attribute of the "STUN Binding-Response" message.

The STUN server 1400 transmits a "STUN Binding-Response" to the address specified in the "Response-Address" attribute of the "STUN Binding-Request" message transmitted by the application layer gateway (ALG) server 1200 (S511).

The application layer gateway (ALG) server 1200 extracts the "Mapped-Address" attribute value of the "STUN Binding-Response" message received in the step of S511, and applies the extracted value to the media receiving address (m/c line) of the "INVITE" received from the SIP user agent A 900 (S513). In this instance, the media receiving address includes an IP address and a port.

In this instance, the application layer gateway (ALG) server 1200 can specify the IP address of the application layer gateway (ALG) server 1200 on the routing path of the "INVITE" message.

In this instance, since the call receiving side is provided on the Internet (60 of FIG. 16), the application layer gateway (ALG) server 1200 specifies the public IP address of the application layer gateway (ALG) server 1200 on the routing path of the "INVITE" message.

Also, when the message is transmitted from the public network to the local network, the application layer gateway (ALG) 1200 specifies the private IP address of the application layer gateway (ALG) 1200.

The application layer gateway (ALG) 1200 transmits the "INVITE" message having undergone the step of S513 to the SIP user agent B 1200 (S515).

In this instance, the SIP user agent B 1500 transmits the "100 trying" that is a receipt response to the "INVITE" message received in the step of S515 to the application layer gateway (ALG) 1200 (S517).

Referring to FIG. 16 to FIG. 18, media receiving information included in the "SDP" message of the "INVITE" message is translated into a public IP address so as to be receivable by the Internet 60 according to the IP masquerading and the STUN binding before the "INVITE" message is transmitted in the case of signaling for a call connection.

Therefore, in the case of the protocol having a signaling stage for a call setup and a media stream stage for actually transmitting/receiving data, the media receiving information included in the session layer that is not translated by the NAT is set to be a public IP address in the earlier signaling stage to thus solve the problem of the NAT-traversal.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

That which is claimed:

1. A session initiation protocol (SIP) message routing method of an application layer gateway (ALG) server for interworking between a local network using a private internet protocol (IP) address and a public network using a public IP address, the SIP message routing method comprising:
   (a) transmitting, from the ALG server to a simple traversal under user datagram protocol (UDP) through network address translation (NAT) (STUN) server, a public IP binding request in which header information is inserted in media and real time control protocol (RTCP) receiving address information in a private IP format, which are extracted from a SIP message received from a call transmitting terminal;
   (b) receiving a public IP binding response including the header information translated into a public IP from the STUN server; and
   (c) applying the media and RTCP receiving address information translated into a public IP to the SIP message, and transmitting the SIP message to a call receiving terminal, wherein the ALG server functions as a STUN client for binding the public IP address.

2. The SIP message routing method of claim 1, wherein the method comprises, before (a), receiving the SIP message from the call transmitting terminal; checking a transmitting subject and a method of the SIP message; and determining whether the networks of the transmitting subjects of the SIP message correspond to each other and whether the message is a request message or a response message.

3. The SIP message routing method of claim 2, wherein (a) comprises:
   extracting m/c/a attribute values in a session description protocol (SDP) of the SIP message when the networks of the transmitting subjects of the SIP message are different and the message is a session request message; and
   changing the header information of the public IP binding request with the extracted m/c/a attribute values.

4. The SIP message routing method of claim 1, wherein (c) comprises:
   changing the media and RTCP receiving address information included in the SIP message with the media and RTCP receiving address information translated into the public IP; selecting the public IP address or the private IP address based on the transmitting subject of the SIP message;
   specifying the selected IP address in routing path information of the SIP message; and
   transmitting the SIP message in which the media and RTCP receiving address information translated into the public IP and the routing path are specified.

* * * * *